Feb. 24, 1970  R. K. RATHMELL  3,496,765
BALL TESTING DEVICE

Filed March 24, 1967  3 Sheets-Sheet 1

INVENTOR.
RICHARD K. RATHMELL

BY
Harry G. Shapiro
ATTORNEY

Feb. 24, 1970   R. K. RATHMELL   3,496,765
BALL TESTING DEVICE

Filed March 24, 1967   3 Sheets-Sheet 2

INVENTOR.
RICHARD K. RATHMELL
BY
Harry S. Shapiro
ATTORNEY

United States Patent Office 3,496,765
Patented Feb. 24, 1970

3,496,765
BALL TESTING DEVICE
Richard K. Rathmell, 12 Pine Tree Road,
Ramsey, N.J. 07446
Filed Mar. 24, 1967, Ser. No. 625,797
Int. Cl. G01n 3/52
U.S. Cl. 73—79          7 Claims

ABSTRACT OF THE DISCLOSURE

A ball testing device in which a ball dropped from a predetermined height rebounds successively from two surfaces and is then captured, as in a sand bed. Golf balls and the like may be simultaneously tested for consistency and distance characteristics, discrepancies being mechanically magnified in terms of horizontal travel in two directions.

---

This invention relates to a ball testing device and more particularly to apparatus for testing golf balls or the like for consistency and distance characteristics simultaneously, by virtue of rebound effects.

Tests show that some golf balls travel somewhat more accurately and/or farther than others, starting with identical impact conditions. Differences of only a few percent are important to ardent golfers seeking the best possible performance. More casual golfers need a way to know when an older ball should be discarded in favor of a better ball, or when to reject inexpensive found or recovered balls. However, most golfers are not sufficiently skilled or consistent in their game to judge differences in ball quality from performance upon a golf course. While simple vertical rebound tests off a hard surface can point up gross differences in elasticity between two balls, smaller differences and the consistency cannot be well established by this means because the height of bounce is not easily judged.

It has heretofore been proposed to test balls for distance characteristics by measuring projected distance after a standard impact. It has also been proposed to test spherical trueness by the ability of the ball to pass through a ring. In one prior testing device a combined qualitative test for distance characteristics (elasticity) and consistency (spherical trueness and uniform elasticity) is accomplished by dropping a ball from a standard height to a first rebound surface. A "good" ball follows a predetermined course, rebounding through an opening to a second rebound surface and then rebounding through another opening. The trajectory of a "bad" ball prevents it from following the same course. While such apparatus can distinguish good balls from bad balls, it is incapable of determining the amount by which a ball may vary from predetermined standards of elasticity and spherical trueness.

Accordingly, it is a principal object of the invention to provide a ball testing device which tests balls for distance characteristics and consistency simultaneously and which produces a quantitative reading of the test results.

Another object of the inveniton is to provide apparatus of the foregoing type in which divergence of the elasticity or spherical trueness from a norm is accentuated for ease in reading test results.

Still another object of the invention is to provide an apparatus of the foregoing type in which balls are captured and segregated in accordance with their elasticity and spherical trueness.

A further object of the invention is to provide apparatus of the foregoing type employing a mechanical lens.

Yet another object of the invention is to provide apparatus of the foregoing type which is simple and attractive and readily adaptable for use at golf courses or driving ranges.

Briefly stated, the present invention employs test apparatus in which a ball is dropped from a predetermined height to a first rebound surface, from which the ball rebounds to a second rebound surface, from which the ball rebounds to an impact area in which the ball is captured and segregated. The second rebound surface is preferably a doubly convex mechanical lens, from which ball defects are magnified in terms of the horizontal travel of the ball along orthogonal directions. Discrepancies are readily observed and measured.

The foregoing and other objects, advantages, and features of the invention will become more readily apparent upon consideration of the following detailed description of the invention taken in conjunction with the accompanying drawings, which illustrate a preferred and exemplary embodiment, and wherein:

FIGURE 1 is a perspective view of apparatus of the invention intended for testing golf balls or the like;

Figure 1:
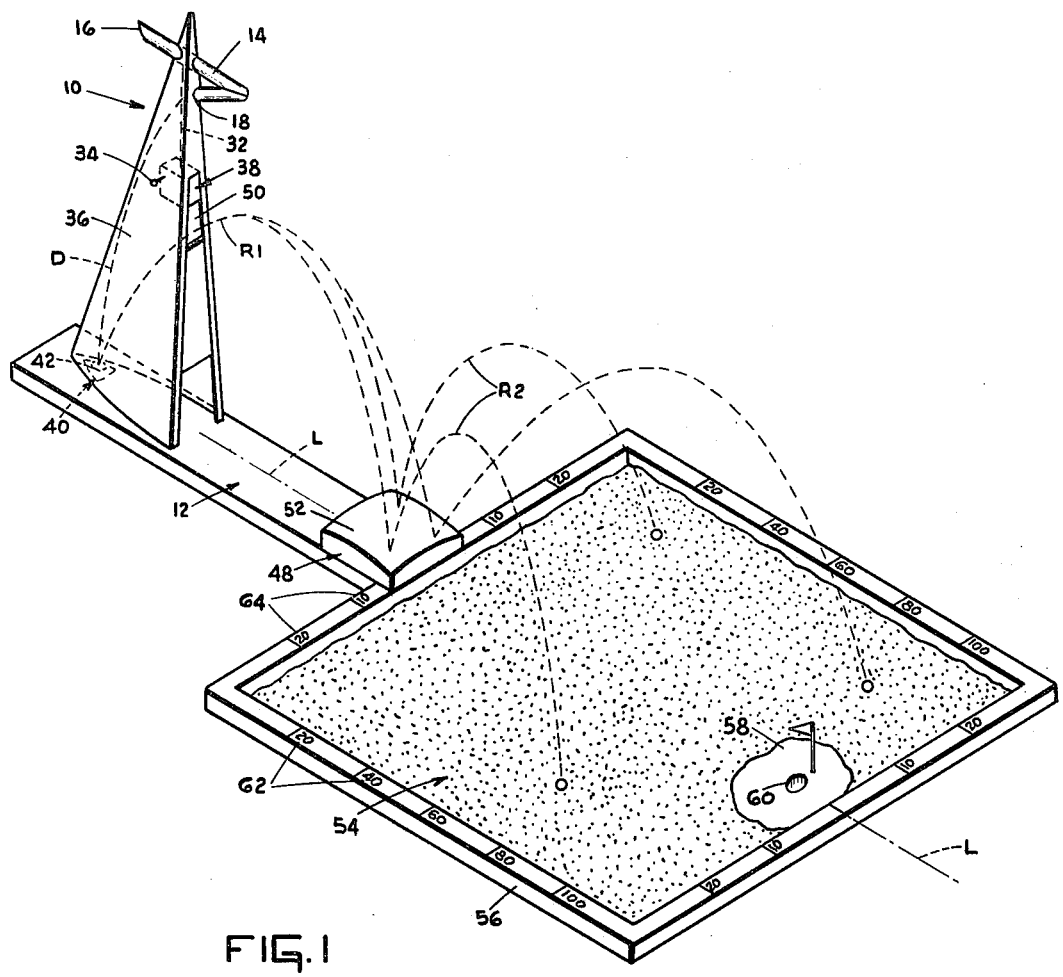

Referring to the drawings, FIGURE 1 illustrates apparatus of the invention constructed for the testing of golf balls and intended for use at a golf course, for example, to permit a player to check the condition of balls prior to play. It will be understood, however, that the apparatus of the invention may also be employed to test other types of balls and in other environments. The apparatus comprises a tower 10, which may be supported upon a base 12, of concrete for example. Near its top the tower supports a chute 14, which may be folded back upon itself, balls being placed into the chute through an entrance 16 and being released from the chute at an exit 18, which for convenience may face in the same general direction as the entrance. A step (not shown) may be provided to permit shorter golfers to reach the entrance 16.

Figure 2:
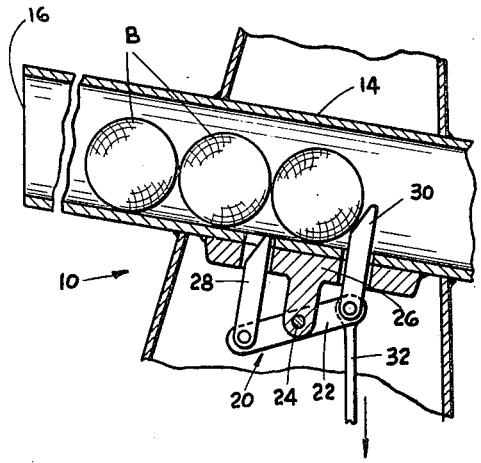
FIGURE 2 is an enlarged, fragmentary, vertical sectional view illustrating a chute and a gate for dispensing balls to be tested one by one.

The release of a series of balls B one by one may be controlled by a ball gate 20 (FIGURE 2) of conventional type, such as those utilized in vending machines. The gate 20, in the form shown, comprises a lever 22 pivoted at its center 24 upon a bracket 26 depending from the chute 14. Fingers 28 and 30, pivotally connected to the ends of lever 22, are arranged to protrude into the chute 14 alternately, through corresponding slots in the chute wall. A rod 32, which may be spring-biased upwardly to the position shown in FIGURE 2, is employed to actuate the gate, the first ball being released when the rod is pulled downwardly to withdraw finger 30 and the second ball being held back when the finger 28 is simultaneously inserted into the chute. It will be apparant that when rod 32 is released and the gate returns to the position illustrated in FIGURE 2, finger 28 will be withdrawn to permit the next ball to advance, and finger 30 will be reinserted to prevent the release of the ball. As shown in FIGURE 1, rod 32 may be actuated by a handle 34 exposed through the side wall 36 of the tower 10. The handle may be part of a conventional coin-controlled mechanism 38, which, as is well known in the art, may permit a given number of actuations of the gate for a given price. The coin-controlled mechanism may employ a timer, instead of an actuation counter, or may be omitted altogether if desired.

The side walls 36 may enclose the tower structure on at least three sides in order to shield the inside of the tower from wind and to prevent unauthorized use of the apparatus.

Figure 3:
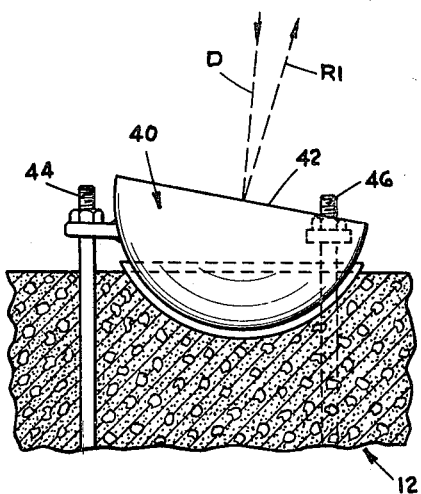
FIGURE 3 is a vertical sectional view illustrating a first rebound member of the invention.

A ball released from the exit 18 of the chute has a drop trajectory D with a rearward horizontal component, that is, a horizontal component toward the entrance 16. A first rebound member 40 is provided below and rearward of the chute exit 18, as shown in greater detail in FIGURE 3. Rebound member 40 has a rebound surface 42, preferably flat, angulated to produce ball rebound R1 with a forward horizontal component, that is, opposite to the horizontal component of the drop trajectory D. The elevation angle of surface 42 may be adjusted, as by adjusting screws 44 and 46, for example, or by any other conventional adjusting means. In the form shown the rebound member 40 has a spherical or cylindrical bottom configuration mounted in a socket in the base 12 of complementary configuration. Once adjusted to the desired angular position, the rebound member 40 may be fixed in that position indefinitely.

A second rebound member, 48, is mounted upon the base 12 forwardly of the tower 10 and may be completely exposed. An opening 50 is provided at the front of the tower to permit balls to rebound from member 40 to member 48, the elevation angle of first rebound surface 42 being selected to ensure that almost all golf balls will pass through opening 50 and reach rebound member 48.

Rebound member 48 has a rebound surface 52 (see FIGURES 4 and 5), which is preferably doubly convex, that is, convex in longitudinal as well as transverse vertical planes. The precise manner of determining the convexity of the rebound surface will be described hereinafter. It suffices to state here that the convexity produces a mechanical lens, the effect of which is to magnify discrepancies of elasticity and/or spherical trueness in terms of the horizontal travel of a ball rebounding from surface 52.

Balls which are spherically true to a high degree will rebound from surface 52 with a trajectory R2 substantially along the center line L of the testing apparatus, the horizontal travel of the rebound being determined by the elasticity. Balls which are not spherically true to a high degree will rebound with a substantial transverse horizontal component relative to the center line L (see FIGURE 5), the amount of transverse horizontal travel depending upon the amount by which the ball varies from spherical trueness.

In order that the quantitative performance of the balls may be readily analyzed, the balls must be captured and segregated at final impact. In a preferred form of the invention this is accomplished by providing a bed of sand or other granular material 54, which may be contained within a rim 56 defining the perimeter of the impact area. To add interest and aesthetic appeal in the case of golf ball testing, as well as to provide an ultimate measure of performance, an area of the bed may be delineated as a small golf "green" 58 and provided with a cup 60 which will be reached only by the finest balls. The "green" may be formed of a material different from the bed, such as real or artificial grass, and the bed may be shaped to simulate sand traps surrounding the "green" at the front and sides. Scale markings 62 and 64 may be provided upon the rim 56, for example, so that a quantitative readout of ball performance may readily be obtained. It will be understood, however, that within the broader scope of the invention, other types of ball capturing, segregating, and performance readout means may be employed, such as a series of receptacles for capturing the rebounding balls and provided with indicia to designate performance. Also, the impact area may be marked off to indicate the projected distances in terms of actual yardage that the balls would be expected to travel under good driving impacts.

In accordance with the invention a standard impact on the tilted first rebound surface 42 is achieved by rolling a ball off of the fixed chute 14. The tilt of the surface 42 should be set to give substantial horizontal travel to the ball, but not to produce excessive loss of vertical travel. Depending upon the spherical trueness and the elastic characteristics of any ball, repeated tests will cause a scatter of impacts on the rebound lens surface 52. This lens will magnify the scatter, giving a much larger scatter from the second rebound trajectories R2.

It is preferable to have a specially curved lens surface to give relatively undistorted mechanical magnification, as in the case of good optical magnification. The lens must be somewhat larger than the initial scatter of balls to be tested, but to the extent that it is oversized, some magnification power will be lost. Maximum magnification may be achieved by centering the lens in the final impact area and permitting balls to rebound in all directions. However, adequate magnification can be achieved by directing *all* the balls forward, as shown in FIGURE 1. This has the significant advantage of giving a free final impact area.

Figure 4:
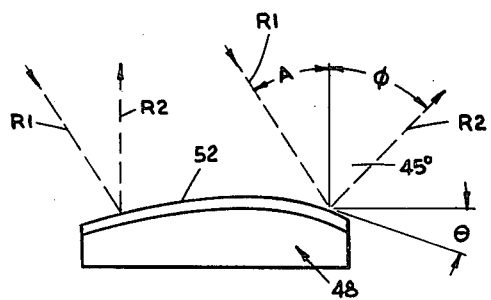
FIGURE 4 is a side elevation view illustrating a second rebound member of the invention.
Figure 5:
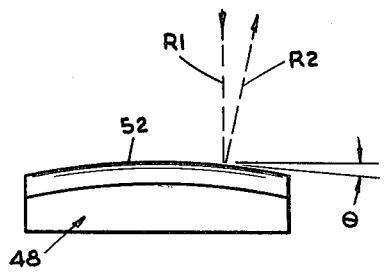
FIGURE 5 is an end elevation view illustrating the rebound member of FIGURE 4.

As shown in FIGURE 4, the portion of the lens farthest from the first rebound surface should cause a rebound angle $\phi$ of forty-five degrees, for maximum horizontal travel, and the closest portion should cause an almost vertical rebound RV, for minimum forward travel. The preferred intermediate angles and the required slopes for the lens can be derived from the following equations:

$$X = \frac{V^2}{g} \sin 2\phi$$

$$\theta = \tfrac{1}{2}(A - \phi)$$

where:

$X$ = horizontal travel after impact
$V$ = velocity after impact
$g$ = gravitational constant.

Intermediate angles $\phi$ and the required lens slope $\theta$ for various impact angles A on the lens are shown in the following table:

| Horizontal travel factor | Rebound angle $\phi$ | Impact angle, A, from vertical | | | |
| --- | --- | --- | --- | --- | --- |
| | | 30 | 35 | 40 | 45 |
| | | Rebound lens surface slope $\theta$, degrees from horizontal | | | |
| 0.0 | 0.0 | 15.00 | 17.50 | 20.00 | 22.50 |
| 0.1 | 2.87 | 13.56 | 16.06 | 18.56 | 21.06 |
| 0.2 | 5.77 | 12.11 | 14.61 | 17.11 | 19.61 |
| 0.3 | 8.73 | 10.63 | 13.13 | 15.63 | 18.13 |
| 0.4 | 11.77 | 9.11 | 11.61 | 14.11 | 16.61 |
| 0.5 | 15.00 | 7.50 | 10.00 | 12.50 | 15.00 |
| 0.6 | 18.43 | 5.78 | 8.28 | 10.78 | 13.28 |
| 0.7 | 22.22 | 3.89 | 6.39 | 8.89 | 11.39 |
| 0.8 | 26.57 | 1.72 | 4.22 | 6.72 | 9.22 |
| 0.9 | 32.08 | −1.04 | 1.46 | 3.96 | 6.46 |
| 1.0 | 45.00 | −7.50 | −5.00 | −2.50 | 0.00 |

It can be seen that the same lens can be tilted to match any of the various impact angles A. Thus, in practice, it becomes unnecessary to measure angle A accurately; it is easier to tilt or "focus" the lens, so that any ball impacting on the rear edge rebounds vertically. Magnification power can be reduced by using only a portion of the available curvature. The curvature to magnify lateral variations in the scatter can be calculated from the above equations, except that angle A is considered to be zero.

Figure 6:
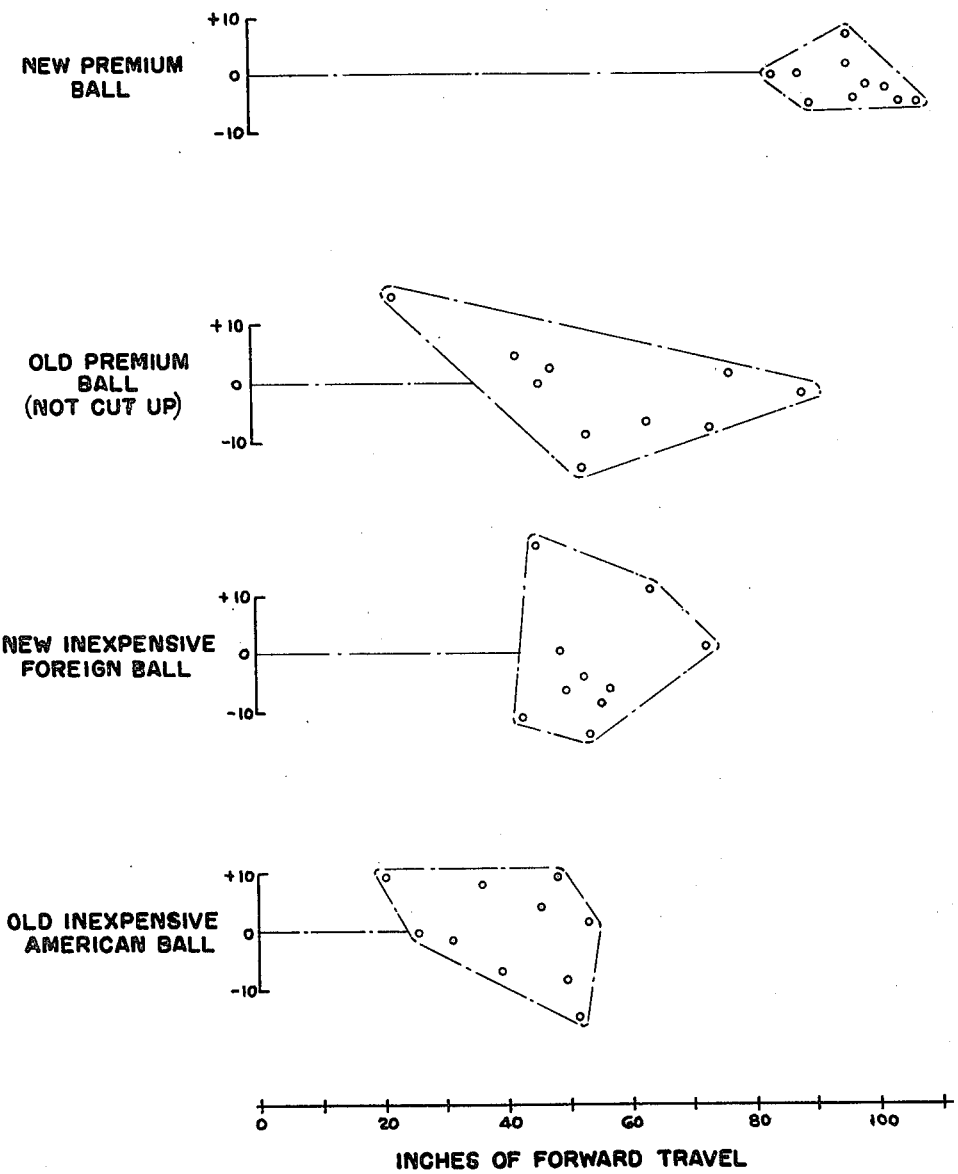
FIGURE 6 is a diagram illustrating the performance of different golf balls in a series of tests employing the apparatus of the invention.

Typical test results are shown in FIGURE 6, from which the relative qualities of some golf balls are evident. Obviously the new premium ball will give greater accuracy in putting and greater distance in drives, all of the final impacts being grouped close to the center line and far from the second rebound surface. However, such a ball may be more subject to hidden damage from hard impacts and/or age than a less elastic ball with a tougher cover. This is apparent from the greater variance of the test results upon an old premium ball in comparison to the test results upon an old inexpensive American made ball. The test results upon a new inexpensive foreign made ball are given for comparison. The results illustrated were obtained with an eighty inch drop from the exit 18 to the first rebound member 40 and with a second rebound member having a lens twenty-two inches long and twelve inches wide with its rear edge about sixty inches from the front edge of the first rebound surface.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative, rather than restrictive of the invention, and those modifications which come within the meaning and range of equivalents of the claims are to be included therein.

The invention claimed is:

1. Apparatus for testing balls comprising first and second rebound surfaces, means for releasing balls from a predetermined position and for causing the balls to strike said first surface and to rebound therefrom to cause the balls to strike said second rebound surface, and an area covered by granular material for capturing the balls at their individual points of impact after rebound from said second rebound surface, said area having scale means associated therewith for measuring the position of the captured balls relative to a reference.

2. The apparatus of claim 1, wherein the second rebound surface is convexly shaped.

3. The apparatus of claim 1, wherein the second rebound surface is doubly convex.

4. Apparatus for testing balls comprising first and second rebound surfaces, means for releasing balls from a predetermined position and for causing the balls to strike said first surface and to rebound therefrom with a horizontal component of travel to cause the balls to strike said second rebound surface, said second rebound surface being convexly shaped to produce a rebound having a magnified component of travel whereby the extent of travel of the balls tested may be determined.

5. Apparatus according to claim 4, wherein the second rebound surface is doubly convex.

6. Apparatus according to claim 4 including means for capturing the balls at their individual points of impact after rebound from the second rebound surface, and scale means associated with the ball capturing means for measuring the position of captured balls relative to a reference.

7. Apparatus according to claim 6, wherein the ball capturing means comprises a bed of granular material simulating a golf green, and a cup for receiving only those balls which show, on rebound, a predetermined degree of elasticity and spherical trueness.

References Cited

UNITED STATES PATENTS

| 1,552,652 | 9/1925 | Sauveur | 73—79 |
| 2,740,287 | 4/1956 | Gindraux | 73—12 |
| 1,657,913 | 1/1928 | Barnett | 273—195 X |
| 2,517,545 | 8/1950 | Cushman et al. | 73—13 |

RICHARD C. QUEISSER, Primary Examiner

J. R. FLANAGAN, Assistant Examiner

U.S. Cl. X.R.

73—13